United States Patent
Menke (10) Patent No.: US 8,277,185 B2
(45) Date of Patent: Oct. 2, 2012

(54) WIND TURBINE, WIND TURBINE CONTROLLER AND METHOD FOR CONTROLLING A WIND TURBINE

(75) Inventor: Detlef Menke, Lotte (DE)

(73) Assignee: General Electric Company, Schenectady, NY (US)

( * ) Notice: Subject to any disclaimer, the term of this patent is extended or adjusted under 35 U.S.C. 154(b) by 1229 days.

(21) Appl. No.: 11/966,029

(22) Filed: Dec. 28, 2007

(65) Prior Publication Data

US 2009/0169378 A1    Jul. 2, 2009

(51) Int. Cl.
*F03D 7/04* (2006.01)
(52) U.S. Cl. .................. 416/61; 416/500; 416/1
(58) Field of Classification Search .......... 416/61, 416/155, 500
See application file for complete search history.

(56) References Cited

U.S. PATENT DOCUMENTS

| | | | |
|---|---|---|---|
| 3,079,105 A * | 2/1963 | Raspet | 244/1 R |
| 4,934,192 A * | 6/1990 | Jenkins | 73/660 |
| 6,195,982 B1 * | 3/2001 | Gysling et al. | 60/204 |
| 6,619,918 B1 * | 9/2003 | Rebsdorf | 416/1 |
| 6,940,185 B2 * | 9/2005 | Andersen et al. | 290/44 |
| 8,021,110 B2 * | 9/2011 | Kerber | 416/1 |
| 2003/0071467 A1 | 4/2003 | Calley et al. | |

FOREIGN PATENT DOCUMENTS

| | | |
|---|---|---|
| CN | 1410669 A | 4/2003 |
| DE | 100 65 314 B4 | 7/2002 |
| WO | WO 02/053910 A1 | 7/2002 |

OTHER PUBLICATIONS

Office Action issued in connection with CN Application No. 200810189529.7. Apr. 27, 2012.

* cited by examiner

*Primary Examiner* — Ninh H Nguyen
(74) *Attorney, Agent, or Firm* — Global Patent Operation; Douglas D. Zhang (57) ABSTRACT

A wind turbine having at least one rotor blade attached to a rotor hub is provided, wherein the wind turbine further includes at least one sensor disposed at or near the rotor blade, the sensor being adapted to detect an aerodynamic condition of the rotor blade.

18 Claims, 7 Drawing Sheets

WIND TURBINE, WIND TURBINE CONTROLLER AND METHOD FOR CONTROLLING A WIND TURBINE

BACKGROUND OF THE INVENTION

A wind turbine, a wind turbine controller, and a method for controlling a wind turbine are disclosed herein. In particular, the wind turbine, the wind turbine controller, and the method for controlling the wind turbine described herein are adapted to take rotor blade stall into account.

By means of their rotor blades, wind turbines capture kinetic energy from wind and convert it into rotational energy of a rotor shaft. Typically, this rotational energy is used to drive an electric generator, either directly or via a gear box. The amount of power extracted from the wind depends, inter alia, on the aerodynamic angle of attack between the rotor blade nose and the incoming air flow. If, for a given wind speed, a certain maximum angle of attack is exceeded, the flow separates at the rotor blades' surface and vortices form at the blade. This effect is known as stall and limits the aerodynamic power capture. Furthermore, stall may increase the noise generated by the wind turbine which might be a problem, e.g. when the turbine site is located near residential areas and particularly during nighttimes.

BRIEF DESCRIPTION OF THE INVENTION

In view of the above, a wind turbine having at least one rotor blade attached to a rotor hub is provided, the wind turbine further including at least one sensor disposed at or near the rotor blade, the sensor being adapted to detect an aerodynamic condition of the rotor blade.

According to another aspect, a pitch control system for a wind turbine is provided, the pitch control system including a first input terminal adapted to receive an input from at least one sensor disposed at or near a rotor blade of said wind turbine, the sensor being adapted to detect an aerodynamic condition of the rotor blade, wherein the pitch control system is adapted to control the pitch angle of said rotor blade on the basis of said sensor input.

According to a further aspect, a method for controlling a wind turbine includes detecting a stall condition of at least one rotor blade of a wind turbine, and adjusting the pitch angle of said at least one rotor blade in order to reduce the stall.

Further aspects, advantages and features are apparent from the dependent claims, the description and the accompanying drawings.

BRIEF DESCRIPTION OF THE DRAWINGS

A full and enabling disclosure of embodiments, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation. For example, features illustrated or described as part of one embodiment can be used on or in conjunction with other embodiments to yield yet a further embodiment. It is intended that such modifications and variations are included herewith.

Figure 1:
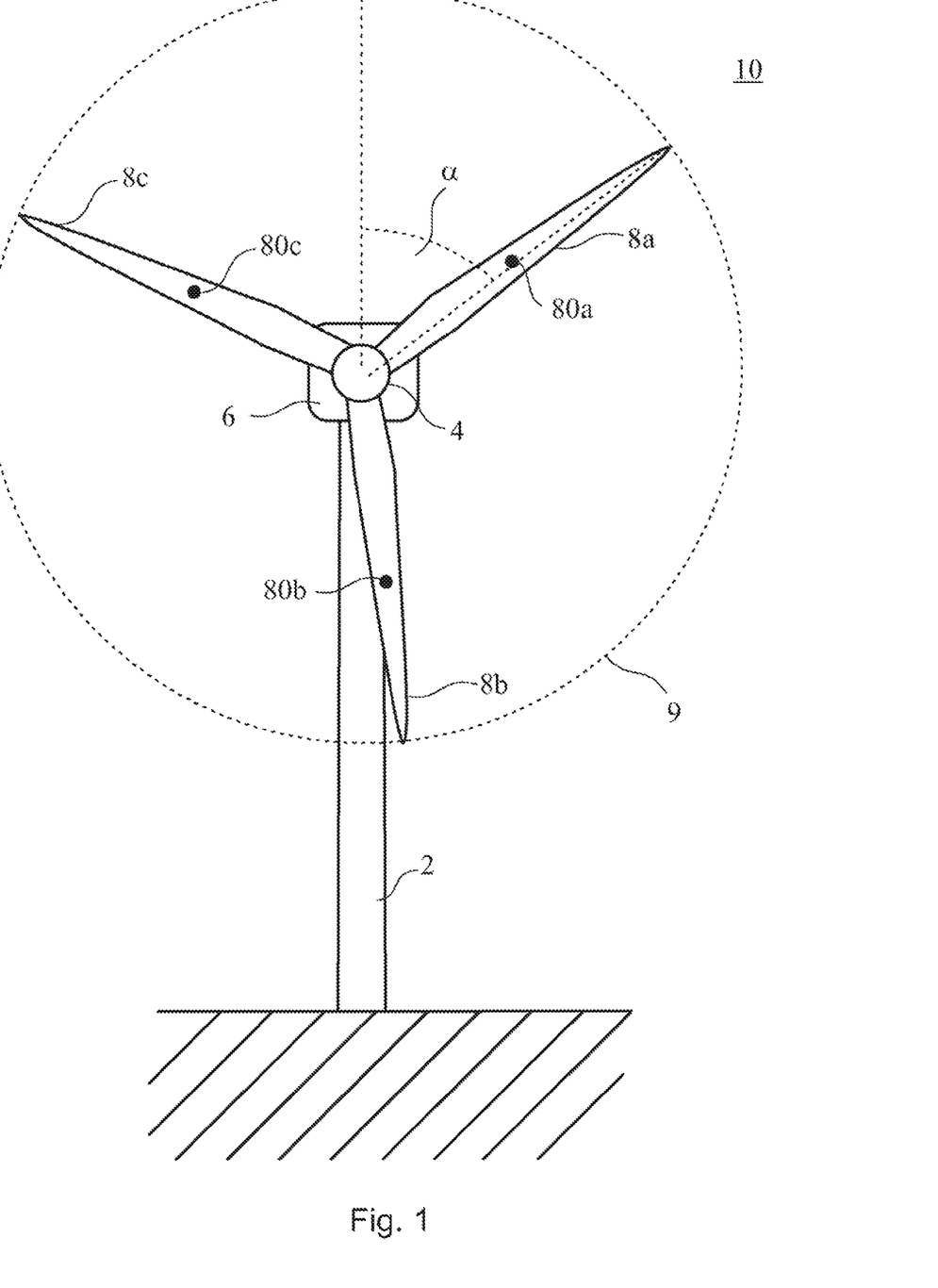
FIG. 1 shows a front view of a wind turbine according to an embodiment.

FIG. 1 shows a front view of a wind turbine 10 according to an embodiment. The wind turbine 10 includes a tower 2 on top of which a nacelle 6 is mounted. A wind rotor 4 equipped with three rotor blades 8a, 8b, 8c is rotatably mounted to nacelle 6. It will be understood by those skilled in the art that the embodiments of the present invention may also be applied to wind turbines having one, two, or more than three rotor blades. Rotor blades 8a, 8b, 8c capture kinetic energy from the wind and urge rotor 4 to rotate about its rotation axis. While rotating, rotor blades 8a, 8b, 8c define a circular disc 9. The rotational position of a rotor blade on this disc can be described by an angle α. The angle α may be defined as the angle between the longitudinal axis of the rotor blade and the vertical tower axis as shown in FIG. 1. Although this is the most straightforward definition of the rotational position, also other definitions may be applied in the embodiments of the present invention as long as the rotational position of the rotor blade(s) can be uniquely determined.

Further to the above, the wind turbine 10 includes sensors 80a, 80b, 80c disposed at the rotor blades 8a, 8b, 8c, respectively. Although each rotor blade 8a, 8b, 8c is equipped with a respective sensor 80a, 80b, 80c in the embodiment shown in FIG. 1, it will be understood by those skilled in the art that in some embodiments of the present invention only one or two rotor blades will be equipped with sensors. Furthermore, only one sensor 80a, 80b, 80c is shown per rotor blade in FIG. 1 but it will be understood by those skilled in the art that two or more sensors per rotor blade may be applied in embodiments according to the present invention. Each sensor 80a, 80b, 80c is adapted to detect an aerodynamic condition of the rotor blade. Typically, the aerodynamic condition detected by a sensor 80a, 80b, 80c is a stall condition of the rotor blade to which the sensor is associated. However, also other aerodynamic conditions may be detected by the sensors 80a, 80b, 80c, for example deterioration of the aerodynamical performance of the rotor blade due to icing, increased surface roughness or fouling.

In one example, the sensor 80a, 80b, 80c is an acoustical sensor, e.g. a microphone. The microphone is adapted to capture the noise generated by the rotating blade. For example, the microphone may be integrated in the respective rotor blade at one or more locations along the longitudinal extension of the blade at a position allowing the detection of noise emission generated by the rotating rotor blade. In another example, the sensor is a vibration sensor adapted to detect a vibrational condition of the rotor blade. Like the microphone, also the vibration sensor may be integrated into the rotor blade. Of course, also a combination of microphones and vibration sensors or even other sensors may be provided to detect the aerodynamical condition of the monitored rotor blade. Since certain aerodynamical conditions result in a change of the noise generated by the rotor blade or a change in the vibration behavior of the blade, such aerodynamical conditions may be detected by monitoring the noise generation and/or vibrational state of the rotor blade. For example, a blade stall may be detected due to a considerable increase in noise emission and/or due to an increase and/or change in the vibrational condition of the rotor blade. Thus, the above described sensors provide sensor data allowing to detect such an undesired aerodynamical condition. Furthermore, this allows counteracting the undesired aerodynamical condition when it is detected, e.g. by controlling the pitch angle of the rotor blades.

Figure 2:
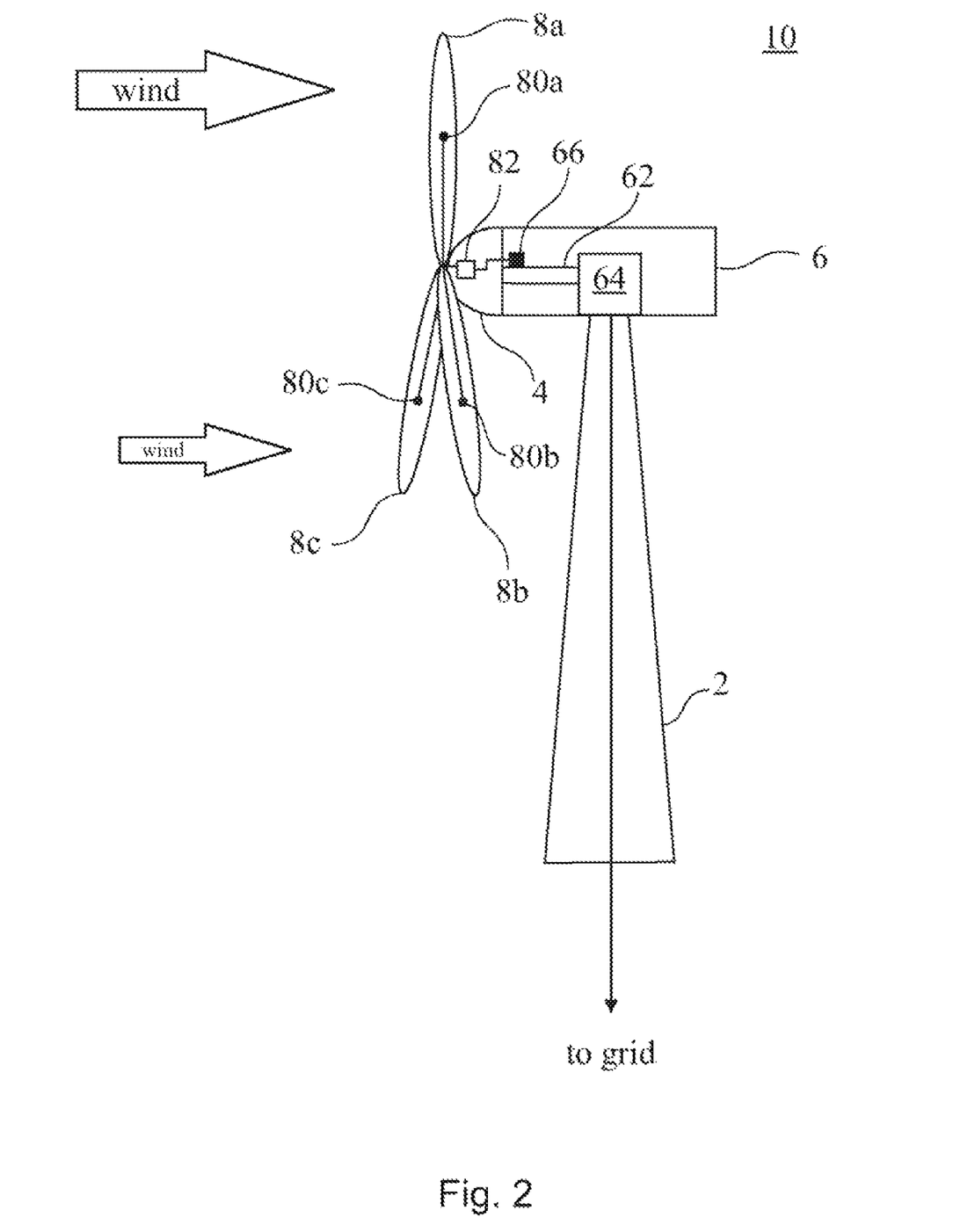
FIG. 2 shows a side view of a wind turbine according to an embodiment.

FIG. 2 shows a side view of a wind turbine 10 according to an embodiment. The wind turbine shown in FIG. 2 includes a pitch control system 82 which is adapted to control the pitch angle of the rotor blades and, thus, the rotor blades' angle of attack. In one embodiment, pitch control system 82 is adapted for individual control of each rotor blade 8a, 8b, 8c. In other words, pitch control system 82 may adjust the pitch angle of each rotor blade 8a, 8b, 8c differently depending on the individual conditions of the respective rotor blade. As is shown in FIG. 2, the sensors 80a, 80b, 80c are connected to pitch control system 82. Furthermore, sensors 80a, 80b, 80c are adapted to provide a sensor signal indicative of the detected noise and/or vibration of a respective rotor blade 8a, 8b, 8c to pitch control system 82. Although only one common pitch control system 82 for all rotor blades 8a, 8b, 8c is shown in FIG. 2, it will be understood by those skilled in the art that a separate pitch control (not shown) may be individually provided for each rotor blade 8a, 8b, 8c. In such an embodiment, each of the several pitch controls may be only connected to the sensor(s) of the rotor blade it controls. However, also in such an embodiment each separate pitch control may also have input from sensors of other rotor blades so that, e.g. aerodynamical conditions of a trailing rotor blade can be anticipated from sensor data of a leading blade.

According to an embodiment, pitch control system 82 is adapted to control the pitch angle of a rotor blade in case a stall condition of the rotor blade is detected on the basis of the sensor input. As has been described above, a blade stall occurs if the angle of attack is too large so that the air flow separates at the blade's surface. In order to reduce the blade stall, pitch control system 82 adjusts the pitch angle of the stalled blade such that the angle of attack is reduced. As a result, also the blade stall is reduced or even neutralized. Thus, the cooperation of the sensors and the pitch control system according to embodiments can increase turbine efficiency because losses due to stalled rotor blades are reduced or even completely avoided. Furthermore, noise emission due to stalled rotor blades can be considerably reduced or even completely avoided by embodiments of the present invention.

Next, another embodiment is described with reference to FIG. 2. Therein, it is shown that rotor hub 4 is connected to a rotor shaft 62 which, in turn, is connected to an electric generator 64 either directly or via a gear box (not shown). On rotor shaft 62, a rotation sensor 66 is mounted, wherein rotation sensor 66 is adapted to detect a rotational position of the rotor hub 4. It will be understood by those skilled in the art that rotation sensor 66 mounted at rotor shaft 62 is only an exemplary embodiment of a rotation sensor capable of detecting the rotational position of hub 4. Accordingly, any other rotation sensor capable of detecting the rotational position of hub 4 may be likewise applied in embodiments of the present invention. As is shown in FIG. 2, pitch control system 82 is further adapted to receive an input from rotation sensor 66. In other words, pitch control system 82 not only considers the noise data and/or vibration data provided by sensors 80a, 80b, 80c but also the rotational position of hub 4. Furthermore, it should be understood that pitch control system 82 may determine the rotational position of each rotor blade 8a, 8b, 8c from the data provided by rotation sensor 66. Thus, pitch control system 82 may also take into account the rotational position α of each rotor blade when controlling the pitch angle for this rotor blade. Knowledge of the rotational position α of the rotor blade may improve stall monitoring and control for this rotor blade for the following reason. Typically, the blade pitch angle depends on the rotational speed of the wind rotor, and the rotational speed of the wind rotor depends on the incoming wind speed experienced by the wind rotor. Particularly, the rotational speed of the wind rotor depends on the incoming wind speed with the disc 9 defining the area covered by the rotating blades 8a, 8b, 8c. However, wind speed is not constant across the disc 9. In particular, wind speed is higher in the upper area of disc 9 compared to the lower area of disc 9. In other words, wind speed is lower near to the ground compared with wind speed more distant from the ground, e.g. above nacelle 6. This variation in wind speed is indicated in FIG. 2 by the different size of the two arrows representing the incoming air flow. Due to this wind speed variation with height, a certain pitch angle of a rotor blade cannot be ideal for every rotational position α of the rotor blade. Accordingly, blade stall may occur at some rotational positions α of the rotor blade or even within a whole range of angles α. As the rotational position of the hub, and thus also of each individual rotor blade, is used to control the pitch angle of the rotor blades 8a, 8b, 8c wind speed variation can be taken into account by pitch control system 82.

Figure 3:
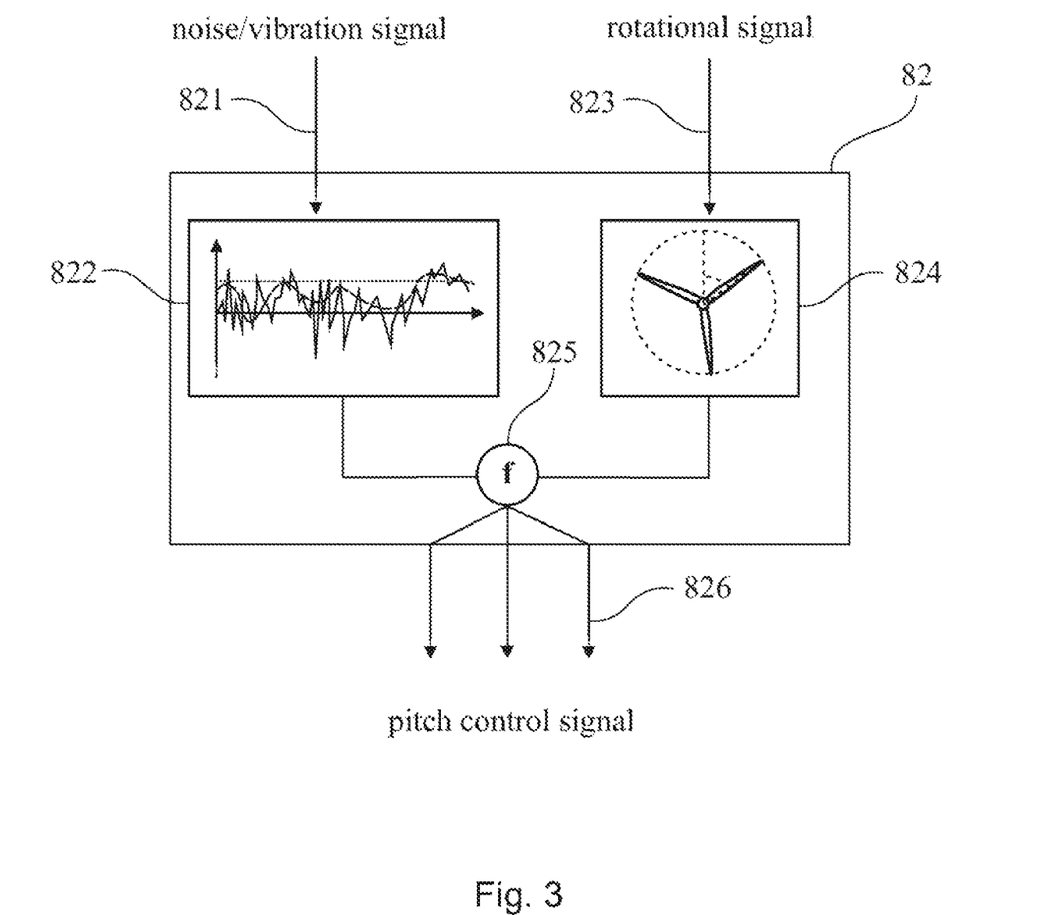
FIG. 3 shows a schematic diagram of pitch control system according to an embodiment.

FIG. 3 shows a schematic diagram of pitch control system 82 according to an embodiment. Therein, pitch control system 82 includes a first input terminal 821 adapted to receive an input from at least one sensor 80a, 80b, 80c disposed at or near a rotor blade of the wind turbine. This sensor is adapted to detect an aerodynamic condition of the rotor blade as has been described above. For example, the sensor may be a microphone providing noise data to pitch control system 82. Additionally or alternatively, the sensor may be a vibration sensor providing vibration data to pitch control system 82. Pitch control system 82 includes a noise/vibration analyzing unit 822 to which the sensor data is provided.

Figure 4:
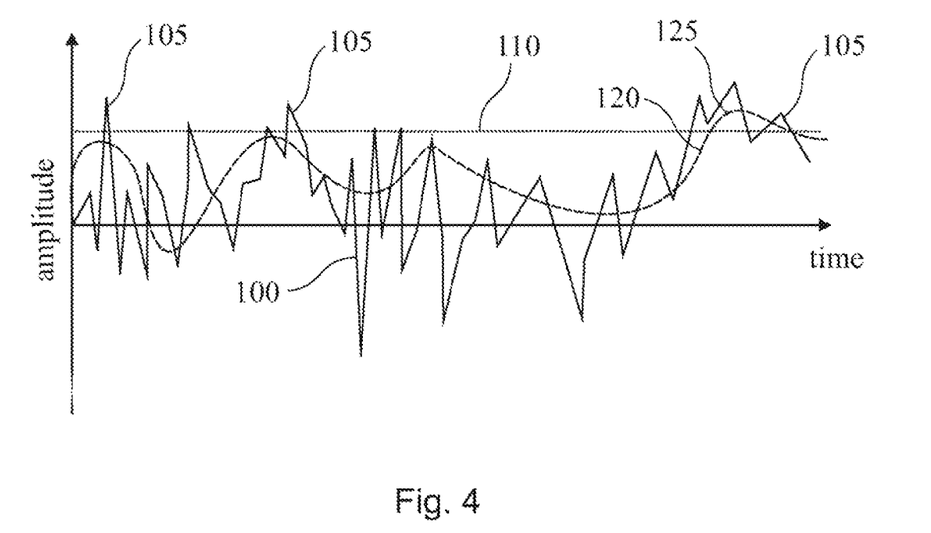
FIG. 4 shows a detected noise and/or vibrational signal.

The operation of the noise/vibration analyzing unit 822 is now described in more detail with reference to FIG. 4. Therein, a noise signal 100 detected by one of the sensors 80a, 80b, 80c is shown. The signal 100 indicates the variation of the noise amplitude with time. Higher values of the signal correspond to higher amplitudes of the noise generated by the rotating rotor blade. Furthermore, a threshold value 110 is shown as a dashed line in FIG. 4. As has been described above, a stall condition or other undesired aerodynamical conditions manifest themselves as an increase in noise emission. Therefore, a threshold value 110 may be empirically determined which, if exceeded, indicates occurrence of a blade stall or another undesirable aerodynamical condition. As is shown in FIG. 4, the noise amplitude 100 exhibits several peak values 105 exceeding threshold 110. Therefore, a blade stall may be detected by comparing the actual amplitude value 100 with the threshold value 110. For amplitude values 105 exceeding threshold value 110, a blade stall is detected.

According to another embodiment, the amplitude signal may be smoothed. Typically, the smoothing is performed by time-averaging the amplitude signal to obtain a time-averaged amplitude signal 120 shown in dashed line in FIG. 4. More typically, the time average of the signal is determined for a specific time period or time window moving along with the signal. This is also often referred to as a moving average. The advantage of a smoothed signal is that rapid variations in the original amplitude signal are usually only slowly followed by the smoothed signal. Especially, the smoothed signal 120 exceeds threshold value 110 only if the rapidly varying actual signal 100 exceeds threshold value 110 for quite some time. This effect is apparent from FIG. 4 where smoothed signal 120 stays below threshold value 110 even though the actual amplitude signal 100 exceeds threshold value 110 at several points 105. Only when amplitude signal 100 stays above threshold value 110 for quite some time, also the smoothed signal has a peak 125 exceeding threshold value 110. Using a smoothed signal 120 as the basis for detecting a blade stall may thus prevent pitch control system 82 from rapidly varying control action due to random short-time events. As will be understood by those skilled in the art, the time constant of the time average, i.e. the time period over which signal 100 is averaged, may be selected in accordance with the conditions of an application. By setting this time constant, the inertia of the control can be adjusted.

Although the above description mainly referred to noise signals, it will be understood by those skilled in the art that the same principles also apply to vibration signals. Therefore, a vibration signal may be similarly processed to detect a blade stall. Thus, blade stall may be detected also on the basis of vibration sensors. Furthermore, if stall detection is based on both noise and vibration a blade stall may be detected if only one of the variables, i.e. either noise or vibration, indicates a stall condition or only if both variables simultaneously indicate a blade stall. In the latter case, blade stall event is more certain since two more or less independent variables indicate the same condition.

Figure 5:
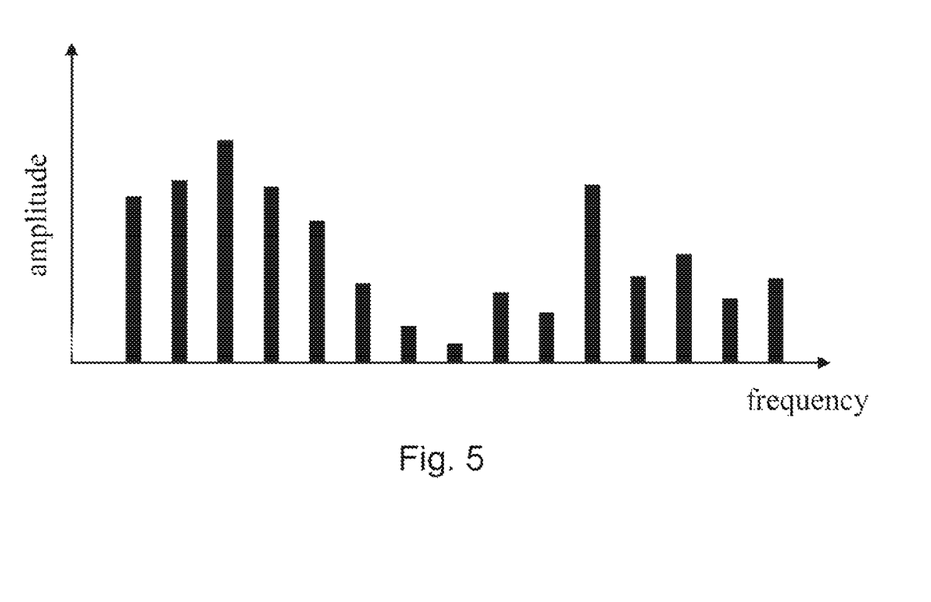
FIG. 5 shows a frequency analysis according to an embodiment.

Additionally or alternatively, noise/vibration analyzing unit 822 may be adapted to perform an analysis of the frequency spectrum of the sensor signal. An example of such frequency analysis is shown in FIG. 5 in which the amplitude levels for several frequencies or frequency bands are shown in a bar diagram. In one example, a frequency analysis of a vibration signal is carried out. Thus, the excitation level of certain frequencies like the rotational eigenmodes of the rotor blade can be identified from the frequency spectrum. Changes in the vibrational frequency spectrum may indicate the occurrence of a certain aerodynamical condition, especially the occurrence of blade stall. Likewise, the frequency spectrum of the noise generated by the rotor blade can be analyzed. For example, tonal noise generated by the rotor blade can be easily detected in the frequency spectrum. Thus, changes in the acoustical frequency spectrum of the noise may indicate the occurrence of a certain aerodynamical condition, especially the occurrence of blade stall. It will be understood by those skilled in the art that the frequency spectrum of the sensor signal can be obtained by well-known methods like fast Fourier transform or the like.

In view of the above, it should be understood by those skilled in the art that noise/frequency analyzing unit 822 provides an analysis of the sensor signals at or near the blades, wherein the analysis allows detection of specific aerodynamical conditions. Now going back to FIG. 3, pitch control system 82 also includes a rotational position analyzing unit 824. Via a second input terminal 823, rotational position analyzing unit 824 receives input from a rotation sensor adapted to detect a rotational position of rotor hub 4, e.g. rotation sensor 62 shown in FIG. 2. Rotational position analyzing unit 824 is adapted to determine the rotational position α of one or more rotor blades 8a, 8b, 8c from the sensor signal. According to another embodiment (not shown), pitch control system 82 is directly provided with the rotational position α of one or more rotor blades 8a, 8b, 8c. Therefore, rotational position analyzing unit 824 may be omitted in this embodiment.

The outputs from noise/emission analyzing unit 822 and from rotational position analyzing unit 824 are provided to a pitch angle determination unit 825. Therein, the information about the aerodynamical condition of each rotor blade 8a, 8b, 8c and the information about the rotational position of each rotor blade is combined to control the pitch angle of each rotor blade accordingly. In particular, if blade stall is detected for one or more rotor blades the pitch angle is controlled so that the angle of attack of the stalled blades is reduced. When controlling the blade pitch angle, also the rotational position of the blade is taken into account by the pitch control system 82. Subsequently, pitch angle determination unit 825 outputs a pitch angle control signal 826 which is transmitted to a pitch angle adjustment device (not shown), e.g. an electric pitch motor or a hydraulic pitch system. The pitch angle adjustment device adjusts the pitch angle according to the pitch angle control signal so that blade stall is reduced or even compensated. Thus, the cooperation of the sensors and the pitch control system according to embodiments can increase turbine efficiency because losses due to stalled rotor blades are reduced or even completely avoided. Furthermore, noise emission due to stalled rotor blades can be considerably reduced or even completely avoided by embodiments of the present invention.

Figure 6:
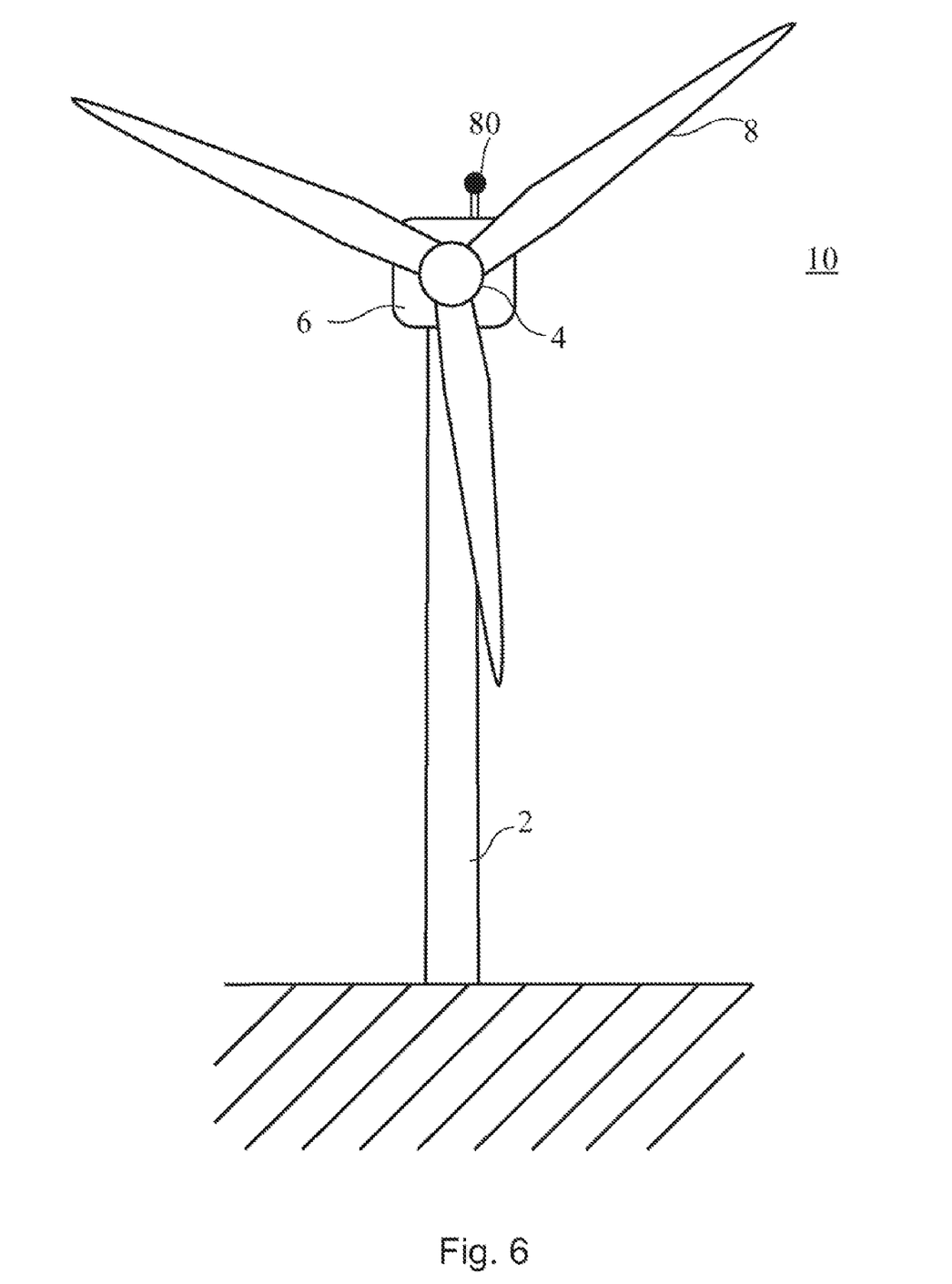
FIG. 6 shows a front view of a wind turbine according to another embodiment.

FIG. 6 shows a front view of a wind turbine according to another embodiment. Therein, a sensor 80 is mounted on top of nacelle 6. Typically, sensor 80 is an acoustical sensor for detecting noise emission from the rotor blades. For example, sensor 80 is a microphone. Other than in the above embodiments described with reference to FIGS. 1 and 2, microphone 80 is not disposed directly at the rotor blades 8 but only near the blades. Since microphone 80 is located downstream the rotor blades 8, noise emission from the blades is well transmitted to microphone 80. The sensor signal provided by microphone 80 can be used to detect an undesired aerodynamical condition of the rotor blades, e.g. blade stall, so that a pitch control system may counteract this aerodynamical condition, e.g. by adjusting the pitch angle of the rotor blades accordingly.

According to a further embodiment, wind turbine 10 may be equipped with a rotation sensor as described above. Thus, the noise signal detected by microphone 80 can be correlated with the rotational positions of the blades 8. Accordingly, the pitch control system may base its control also on the rotational position of the rotor blades as described above.

According to still another embodiment, the nacelle-mounted sensor 80 may be combined with blade-mounted sensors 80a, 80b, 80c as described above. In one example, the nacelle-mounted sensor 80 is a microphone and the blade mounted sensors 80a, 80b, 80c are vibration sensors. However, it will be understood by those skilled in the art that any combination of such sensors may be applied in embodiments of the present invention.

Figure 7:
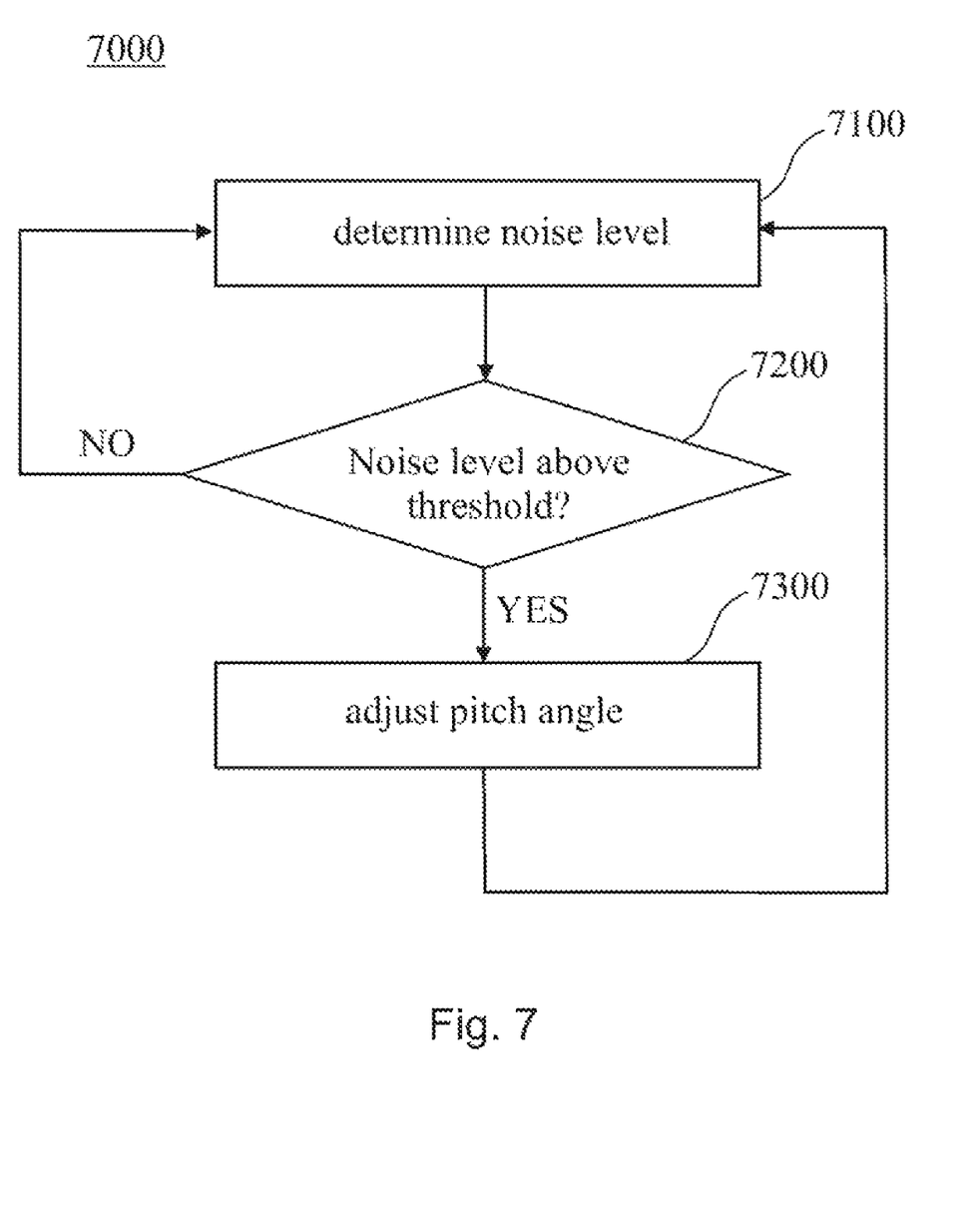
FIG. 7 shows a flow diagram of a method according to an embodiment.

FIG. 7 shows a flow diagram of a control method 7000 according to an embodiment. In a first step 7100, the noise level at a rotor blade is detected, e.g. by a microphone located at or near the rotor blade. In a next step 7200, the detected noise level is compared with a threshold value to detect a stall condition of the monitored rotor blade. If the noise level is below the threshold value, control method 7000 goes back to first step 7100 and measures the noise level. If the noise level, e.g. the amplitude or time-averaged amplitude, exceeds the threshold value, control method 7000 proceeds to step 7300. In this step, the pitch angle of the monitored rotor blade is adjusted in order to reduce the blade stall. After adjusting the blade pitch angle, control method 7000 goes back to first step 7100 and again measures the noise level. It will be understood by those skilled in the art that this control scheme results in an adjustment of the pitch angle until the noise level falls below the threshold again. Furthermore, it will be understood by those skilled in the art that this control method may be performed independently for each rotor blade.

It will be further understood by those skilled in the art that the same control scheme may be applied to a sensed vibration level of the monitored rotor blade. In this case, the pitch angle is adjusted if the vibration level exceeds some predetermined threshold. Furthermore, it will be understood by those skilled in the art that alternatively or in addition also an analysis of the noise and/or vibration frequency spectrum may be performed. Also from such analysis of the frequency spectrum valuable information about the aerodynamical condition of the monitored rotor blade may be extracted. Therefore, the information contained in the frequency spectrum may also be used as a basis for detecting blade stall or another aerodynamical condition.

Figure 8:
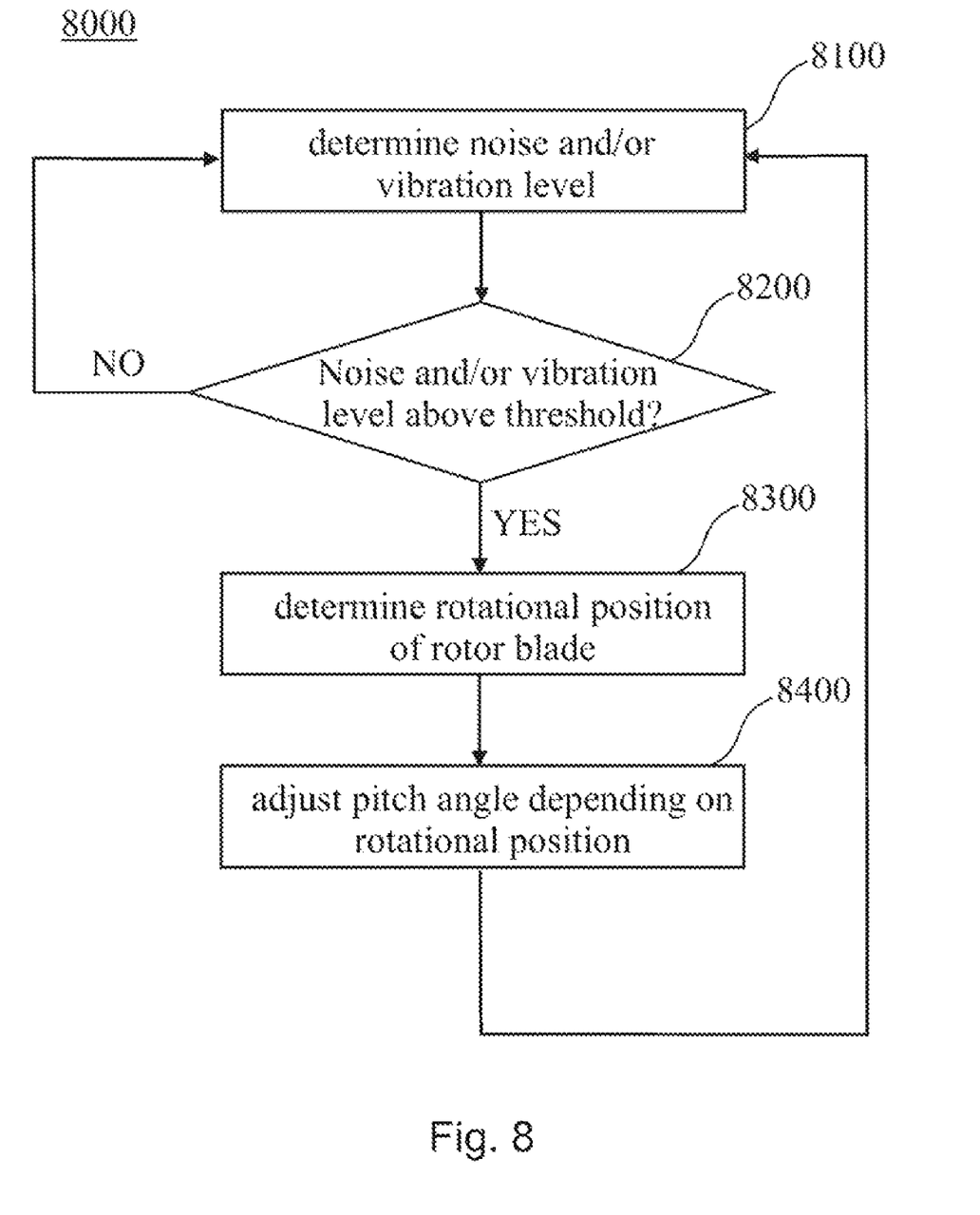
FIG. 8 shows a flow diagram of a method according to another embodiment.

FIG. 8 shows a flow diagram of a control method 8000 according to another embodiment. The basic control scheme of method 8000 is similar to control method 7000. In particular, the noise and/or vibration level of the monitored rotor blade(s) is determined in a first step 8100. In a next step 8200, the detected noise/vibration level is compared with a threshold value to detect a stall condition of the monitored rotor blade. It should be understood that the threshold may be separately set for noise and vibrations signals. If the noise/vibration level is below the threshold value, control method 8000 goes back to first step 8100 and measures the noise/vibration level. If the noise/vibration level, e.g. the amplitude or time-averaged amplitude, exceeds the threshold value, control method 8000 proceeds to step 8300. In one embodiment, both noise and vibration are detected and the threshold value will be considered as being exceed if only one of noise and vibration exceeds its respective threshold. In another embodiment, also both noise and vibration are detected but the threshold value will be considered as being exceed only if both noise and vibration exceed their respective thresholds. In the next step 8300, the rotational position of the monitored rotor blade is determined, e.g. by a rotation sensor located at the rotor shaft. In the next step 8400, the pitch angle of the monitored rotor blade is adjusted in order to reduce the blade stall, thereby taking into account the rotational position of the monitored rotor blade. After adjusting the blade pitch angle, control method 8000 goes back to first step 8100 and again measures the noise level. It will be understood by those skilled in the art that this control scheme results in an adjustment of the pitch angle until the noise/vibration level falls below the threshold again. Furthermore, it will be understood by those skilled in the art that this control method may be performed independently for each rotor blade. Like in control method 7000, also frequency analysis may be performed in control method 8000.

This written description uses examples to disclose embodiments, including the best mode, and also to enable any person skilled in the art to make and use such embodiments. While various specific embodiments have been described, those skilled in the art will recognize other embodiments can be practiced with modification within the spirit and scope of the claims. Especially, mutually non-exclusive features of the embodiments described above may be combined with each other. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wind turbine comprising at least one rotor blade attached to a rotor hub, the wind turbine further comprising at least one sensor disposed at or near the at least one rotor blade, the at least one sensor being configured to detect an aerodynamic condition of the at least one rotor blade, wherein the aerodynamic condition is a stall condition; and
wherein the at least one sensor comprises a vibration sensor configured to detect a vibrational condition of the at least one rotor blade.

2. The wind turbine according to claim 1, wherein the at least one sensor comprises a microphone.

3. The wind turbine according to claim 1, wherein the at least one sensor is integrated in the at least one rotor blade.

4. The wind turbine according to claim 1, wherein the wind turbine comprises a plurality of rotor blades, each rotor blade being equipped with at least one sensor configured to detect an aerodynamic condition of the rotor blade.

5. The wind turbine according to claim 1, further comprising a pitch control system for adjusting the pitch angle of the at least one rotor blade, wherein the pitch control system is configured to receive an input from the at least one sensor and is further configured to control the pitch angle of said at least one rotor blade in case said stall condition of the at least one rotor blade is detected on the basis of said at least one sensor input.

6. The wind turbine according to claim 5, wherein the wind turbine comprises a plurality of rotor blades and the pitch control system is configured to individually control the pitch angle of each rotor blade.

7. The wind turbine according to claim 1, further comprising a rotation sensor configured to detect a rotational position of the rotor hub.

8. The wind turbine according to claim 7, further comprising a pitch control system configured to receive an input from said at least one sensor and an input from the rotation sensor, the pitch control system being further configured to individually control the pitch angle of the at least one rotor blade of the wind turbine on the basis of the input from said at least one sensor and said rotation sensor.

9. A pitch control system for a wind turbine, comprising a first input terminal configured to receive an input from at least one sensor disposed at or near a rotor blade of said wind turbine, the at least one sensor comprises a vibration sensor configured to detect a vibrational condition of the rotor blade, the at least one sensor being configured to detect an aerodynamic condition of the rotor blade, wherein the aerodynamic condition to be detected is a stall condition of the rotor blade, and wherein the pitch control system is configured to control the pitch angle of said rotor blade on the basis of said at least one sensor input.

10. The pitch control system according to claim 9, wherein the at least one sensor comprises an acoustical sensor.

11. The pitch control system according to claim 9, further comprising a second input terminal configured to receive an input from a rotation sensor configured to detect a rotational position of the rotor blade of said wind turbine, wherein the pitch control system is further configured to control the pitch angle of the rotor blade on the basis of the input from said at least one sensor and said rotation sensor.

12. The pitch control system according to claim 9, wherein the wind turbine comprises a plurality of rotor blades and the pitch control system is configured to individually control the pitch angle of each rotor blade.

13. A method for controlling a wind turbine, comprising
   detecting a stall condition of at least one rotor blade of a wind turbine, wherein the stall condition is detected if a sensor signal indicative of acoustical noise venerated by the at least one rotor blade or a vibrational condition of said at least one rotor blade exceeds a predetermined threshold, and
   adjusting the pitch angle of said at least one rotor blade in order to reduce the stall condition.

14. The method according to claim 13, wherein the stall condition is detected by analyzing an amplitude of the acoustical noise generated by said at least one rotor blade and detected by a sensor disposed at or near the at least one rotor blade.

15. The method according to claim 14, wherein a time-averaged amplitude signal is analyzed to detect the stall condition.

16. The method according to claim 13, further comprising analyzing a frequency spectrum of the acoustical noise generated by said at least one rotor blade and detected by a sensor disposed at or near the at least one rotor blade.

17. The method according to claim 13, wherein the stall condition is detected if the sensor signal indicative of the vibrational condition of said at least one rotor blade exceeds a predetermined threshold.

18. The method according to claim 13, further comprising
   detecting a rotational position of said at least one rotor blade when said stall condition is detected, and
   adjusting the pitch angle of said at least one rotor blade on the basis of the detected rotational position of the at least one rotor blade.

* * * * *

UNITED STATES PATENT AND TRADEMARK OFFICE
CERTIFICATE OF CORRECTION

| | | |
|---|---|---|
| PATENT NO. | : 8,277,185 B2 | Page 1 of 1 |
| APPLICATION NO. | : 11/966029 | |
| DATED | : October 2, 2012 | |
| INVENTOR(S) | : Detlef Menke | |

It is certified that error appears in the above-identified patent and that said Letters Patent is hereby corrected as shown below:

In Column 9, Line 4, in Claim 13, delete "venerated" and insert -- generated --, therefor.

Signed and Sealed this
Eighth Day of January, 2013

David J. Kappos
*Director of the United States Patent and Trademark Office*